(12) United States Patent
Wald

(10) Patent No.: US 10,025,080 B2
(45) Date of Patent: Jul. 17, 2018

(54) MICROSCOPE AND COMPONENT FOR MULTI-BEAM SCANNING

(71) Applicant: Carl Zeiss Microscopy GmbH, Jena (DE)

(72) Inventor: Matthias Wald, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/645,697

(22) Filed: Mar. 12, 2015

(65) Prior Publication Data

US 2017/0293126 A1    Oct. 12, 2017

(30) Foreign Application Priority Data

Mar. 15, 2014  (DE) .................. 10 2014 003 773

(51) Int. Cl.
*G02B 21/00* (2006.01)

(52) U.S. Cl.
CPC .................. *G02B 21/002* (2013.01)

(58) Field of Classification Search
CPC .. G02B 21/00; G02B 21/0004; G02B 21/002; G02B 21/0024; G02B 21/0032; G02B 21/0036–21/0048; G02B 21/006; G02B 21/0076; G02B 21/16; G02B 21/18; G02B 17/004; G02B 5/04; G02B 27/10; G02B 27/104; G02B 27/106; G02B 27/1066; G02B 27/14; G02B 27/144; G02B 27/145; G02B 27/147; G02B 26/08; G02B 26/10;

(Continued)

(56) References Cited

U.S. PATENT DOCUMENTS 4,502,757 A * 3/1985 Maeda ................ G02B 27/106
                                                        359/285
5,054,884 A * 10/1991 Kubota ............. G02B 27/1086
                                                         359/15

(Continued)

FOREIGN PATENT DOCUMENTS

DE        19535525        3/1997
DE        19904592        9/2000

*Primary Examiner* — Stephone B Allen
*Assistant Examiner* — Adam W Booher
(74) *Attorney, Agent, or Firm* — Haug Partners LLP

(57) ABSTRACT

A laser-scanning microscope having an illumination-beam path and a detection-beam path and a microscope objective. A component for generating a plurality of scanning beams from at least one illumination beam is located in the illumination-beam path. A wedge-shaped, light-transmitting first component part provided in the illumination beam path generates spatially offset partial beams, the scanning beams being generated at the first component part by multiple reflections at an at least partially partially-reflecting surface. The microscope has a one-dimensional scanner for moving the scanning beams over a sample in the illumination beam path. The scanning beams have at least partially relative to one another a non-zero angle upstream of the objective in the illumination direction. The scanning beams can intersect at least partially in the objective pupil of the microscope objective. Additional compensation elements are provided for the scanning beams to compensate for a spectral dispersion and/or the beam direction.

10 Claims, 5 Drawing Sheets

S: Perpendiculars to the beam direction RL initially
K1-5 Glass wedges
E1-5 Input surfaces of K1-K5
α 1-5 Angles of E1-E5 to S

(58) Field of Classification Search
CPC . G02B 21/06–21/14; G02B 5/045; H01S 3/08
See application file for complete search history.

(56) References Cited

U.S. PATENT DOCUMENTS

| | | | | |
|---|---|---|---|---|
| 5,442,787 | A * | 8/1995 | Steiner | G02B 27/144 |
| | | | | 359/601 |
| 6,219,179 | B1 | 4/2001 | Nielsen et al. | |
| 2007/0183030 | A1* | 8/2007 | Tsuchiya | G02B 21/0088 |
| | | | | 359/388 |
| 2009/0016400 | A1 | 1/2009 | Lee et al. | |
| 2015/0085289 | A1* | 3/2015 | Kang | G02B 21/004 |
| | | | | 356/445 |

* cited by examiner

S: Perpendiculars to the beam direction RL initially
K1-5 Glass wedges
E1-5 Input surfaces of K1-K5
α 1-5 Angles of E1-E5 to S

MICROSCOPE AND COMPONENT FOR MULTI-BEAM SCANNING

The present application claims priority to German Patent Application No. DE 10 2014 003 773.8 filed on Mar. 15, 2014, the disclosure of which is incorporated herein by reference in its entirety.

FIELD OF THE INVENTION

Arrangements for beam multiplication are known from publications and patents.

It is noted that citation or identification of any document in this application is not an admission that such document is available as prior art to the present invention.

An advantageous application is carried out in laser scanning microscopes (LSMs) because, in this way, the scan speed is increased compared to single-point scanning. A beam can be split either by guiding separate beam parts in different directions (geometric splitting) or by using a beam splitter and further utilizing the reflected and transmitted component of the beam (physical splitting). Examples for both principles are mentioned, e.g., in Naumann/Schröder, "Optical Components [Bauelemente der Optik]", pages 182 ff, or in patents DE19535525A1, US20090016400A1, DE19904592C2.

A beam splitting in which the partial bundles have the highest possible homogeneity over the visible spectrum and between one another is important for application in LSM. Further, the beam splitting should be very stable over the long term and insensitive to temperature.

The arrangement according to DE19535525A1 has an even number of reflections per partial bundle so that the arrangement is insensitive to positional tolerances. Since the optically active surfaces are fixedly connected via the glass substrate, this arrangement is both stable and insensitive to temperature. However, it is disadvantageous that all of the partial bundles are formed parallel to one another so that no field angles can be generated. However, these field angles are required so that the objective can focus the partial beams at different locations on the sample.

The arrangement according to DE19904592C2 makes it possible to generate angles between the partial bundles by tilting the mirror surfaces, but stability and insensitivity to temperature are sacrificed owing to the required separate holder of the mirrors.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112), such that applicant(s) reserve the right to disclaim, and hereby disclose a disclaimer of, any previously described product, method of making the product, or process of using the product.

SUMMARY OF THE INVENTION

It is the object of the invention to implement a beam multiplier with preferably equidistant angles between the partial bundles and greater stability at the same time.

In a microscope according to the invention for multi-beam scanning having an illumination beam path and a detection beam path and a microscope objective, wherein a component for generating a plurality of scanning beams from at least one illumination beam is located in the illumination beam path, a wedge-shaped, light-transmitting first component part is provided in the illumination beam path for generating spatially offset partial beams, the scanning beams being generated at this first component part by multiple reflections at an at least partially partially-reflecting surface.

The microscope is configured as laser scanning microscope and has at least one one-dimensional scanner for the scanning movement of the scanning beams over a sample in the illumination beam path.

The scanning beams advantageously have at least partially relative to one another an angle other than zero degrees upstream of the objective in illumination direction.

The scanning beams can preferably intersect at least partially in the objective pupil of the microscope objective. Additional compensation elements can be provided at least partially for the scanning beams to compensate for a spectral dispersion and/or the beam direction.

For n scanning beams, n compensation elements which are preferably configured as further wedge-shaped, light-transmitting component parts can be provided. Compensation elements can be arranged upstream and/or downstream of the first component part.

With less strict requirements, partially adjustable plane plates can also be provided for adjusting an intersection point of the scanning beams or beam direction and/or beam offset thereof.

The invention is further directed to a component for generating a plurality of scanning beams from at least one illumination beam, particularly in a microscope, which is wedge-shaped and light-transmitting for generating spatially offset partial beams and which generates a plurality of scanning beams by multiple reflection at an at least partially partially-reflecting surface of the component.

The illumination means can advantageously be illumination lasers.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
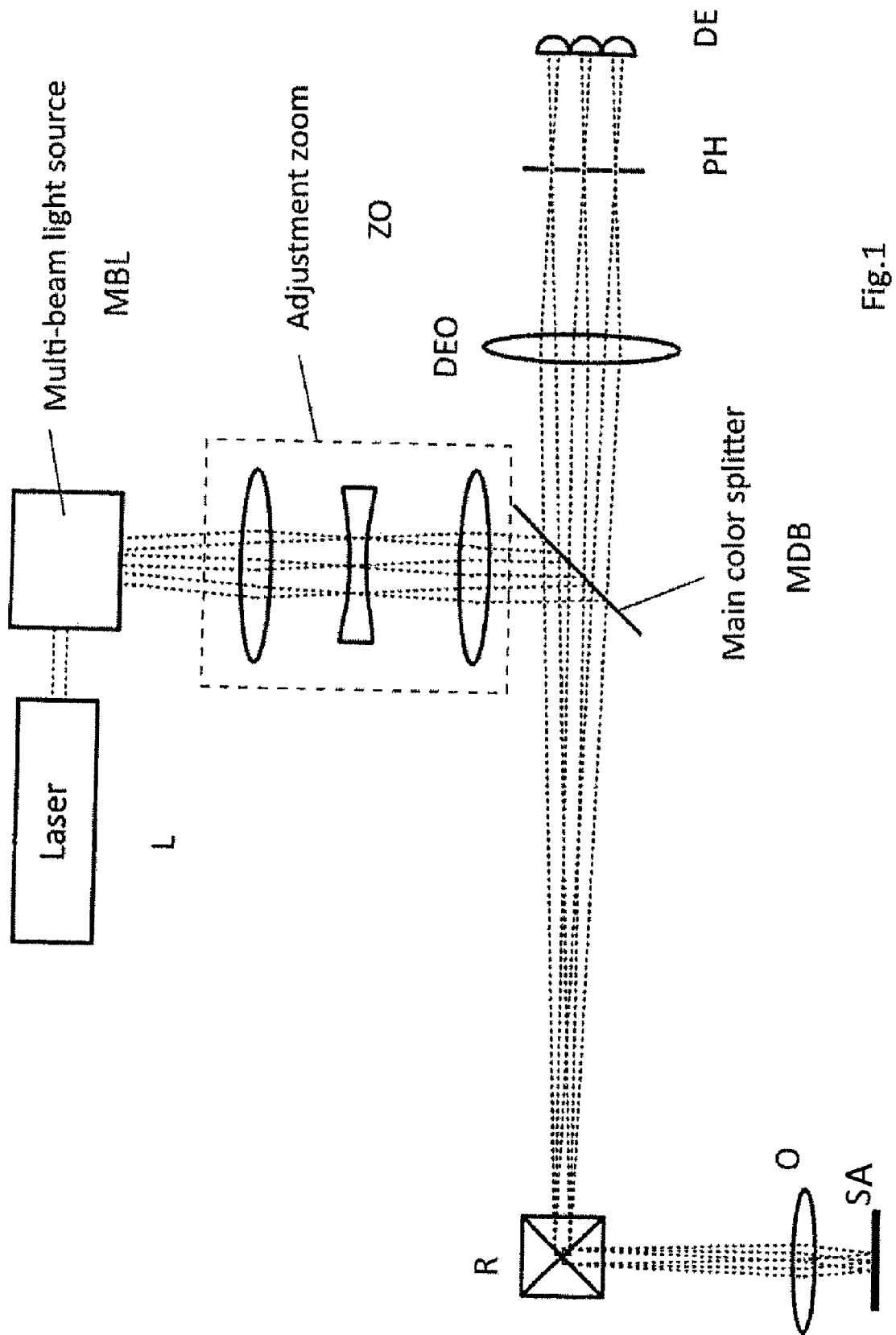
FIG. 1 shows a basic optical arrangement in a microscope with a multiple-beam light source.

First, FIG. 1 shows a basic optical arrangement in a microscope with a multiple-beam light source. The light of a laser L proceeds to an arrangement for beam multiplication MBL as will be described in more detail in the following for the present invention.

The light of the multi-beam light source MBL passes via optics, in this case a zoom ZO, to a main color splitter MBD for separating illumination light from sample light and, from there, is reflected by MDB to a sample SA via a reflector R and an objective O. The sample light, particularly the fluorescent light of interest, passes back via reflector R and transmittingly through MDB to a detector group DE via detector optics DEO and a multiple-pinhole arrangement PH.

The sample light which is generated on or in the sample by the illumination with a plurality of beam foci via objective O is preferably guided in detection direction through a plurality of pinholes PH, an individual pinhole being associated with each individual beam. Optionally, the detector DE can also be configured as spatially resolving area receiver.

Figure 2:
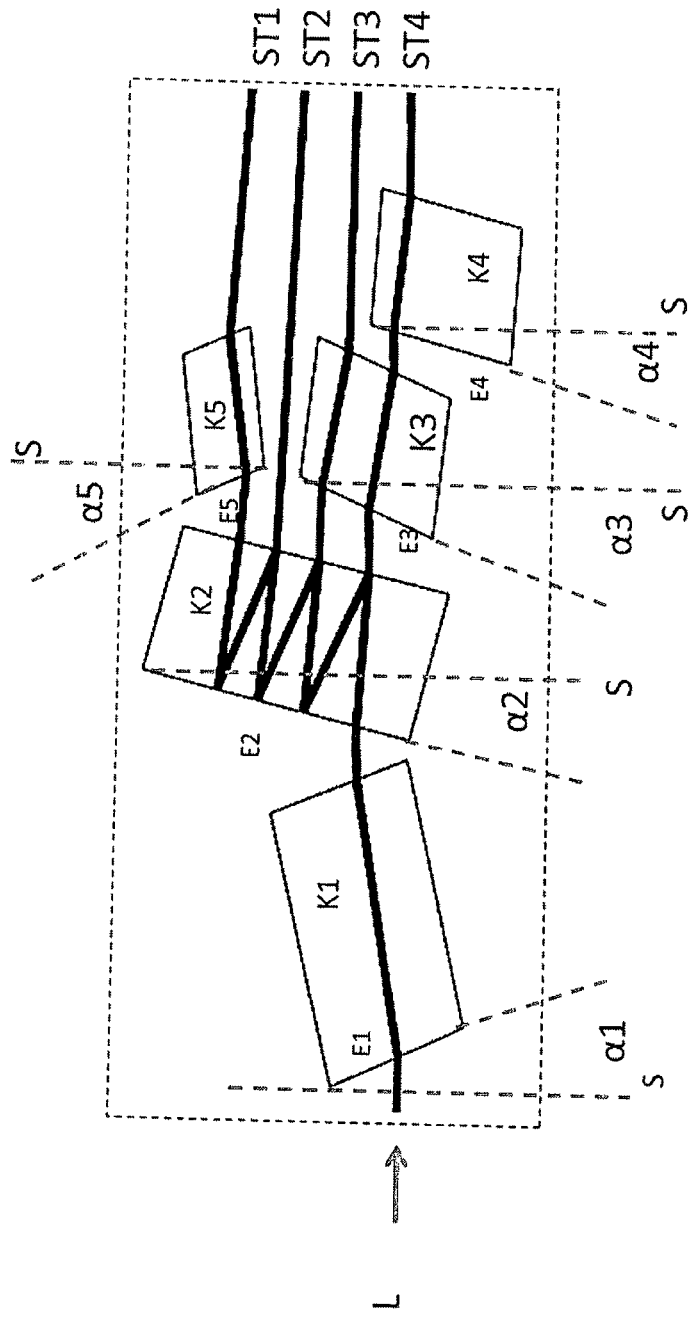
FIG. 2 shows a preferred embodiment example of an optical arrangement according to the invention for beam multiplication.

FIG. 2 shows a preferred embodiment example of an optical arrangement according to the invention for beam multiplication.

The expressions wedges and wedge plates are used synonymously hereinafter.

As used herein, wedge-shaped means that at least two light-active, preferably opposing lateral surfaces of the wedge plates have an angle of less than 90 degrees relative to one another.

As used herein, spectrally independent means that every wavelength dispersion is ultimately compensated in an advantageous manner through the employed elements.

The illumination light L proceeds into a first wedge-shaped glass body or a wedge plate K1 and from there into a second wedge plate K2 in which individual beams ST1-ST4 are generated by multiple total reflection.

While beam ST2 undergoes no further influence after K2, ST1 passes through a further wedge plate K5, ST3 passes through K3, and ST4 passes through K3 and K4. In this way, through suitable dimensioning of wedge plates K3, K4, K5, the beams ST1-ST4 do not run parallel to one another but rather have a converging angle relative to one another, which will be further discussed later.

FIG. 2 further shows perpendiculars s relative to the respective light direction to characterize angles $\alpha1$-$\alpha4$ of input surfaces E1-E5 of K1-K5 relative to s.

Figure 3:
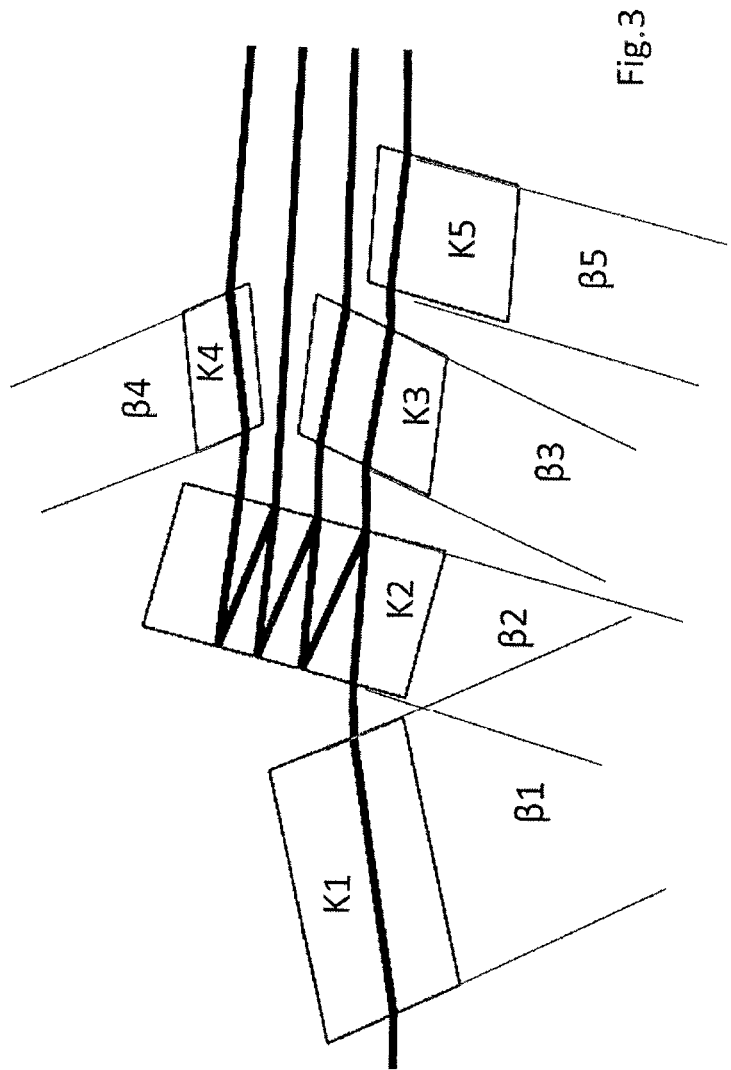
FIG. 3 shows wedge angles $\beta 1$-$\beta 5$ of wedge plates K1-K5.

FIG. 3 shows wedge angles $\beta1$-$\beta5$ of wedge plates K1-K5.

Figure 4:
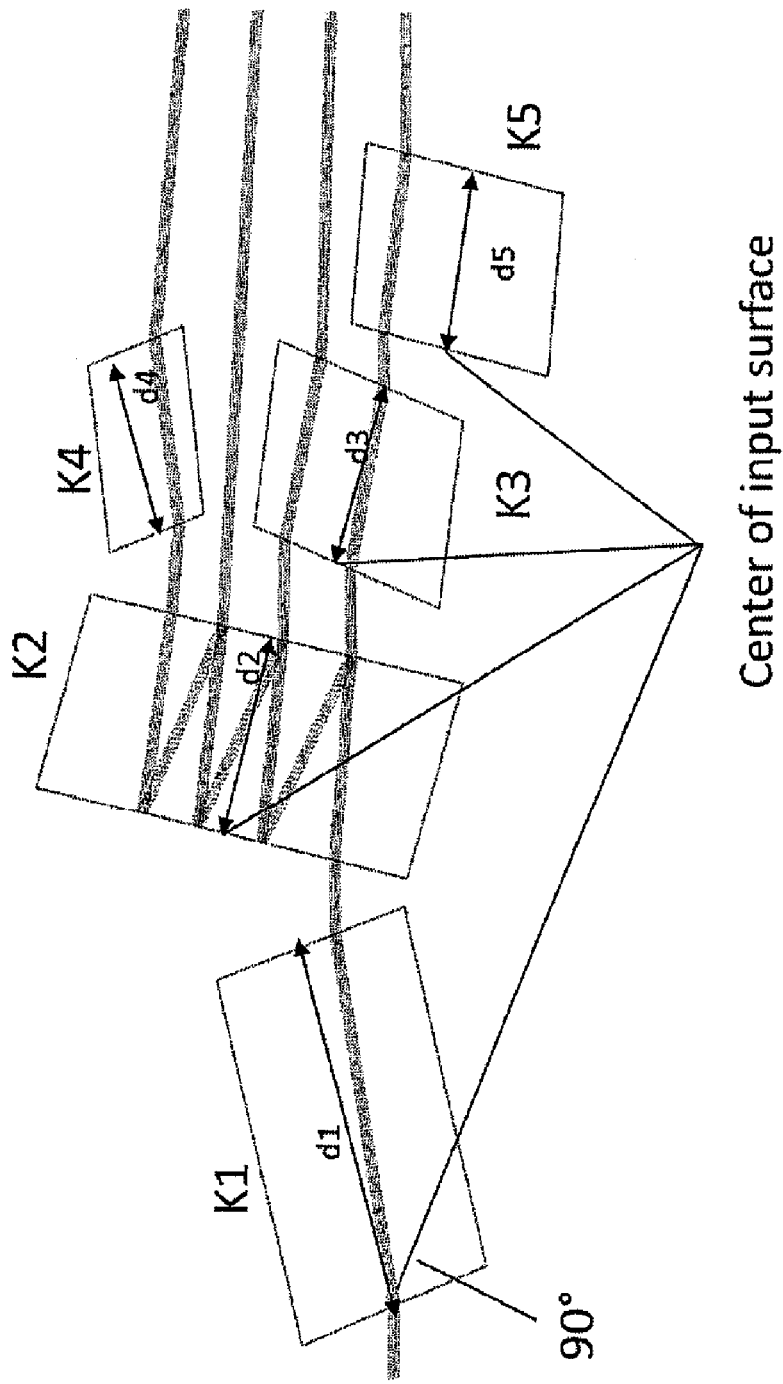
FIG. 4 shows the wedge thickness d1-d5 of K1-K5.

FIG. 4 shows the wedge thickness d1-d5 of K1-K5. It is measured from the depicted center of the input surfaces of K1-K5 perpendicular to the input surface through the respective wedge body. Exemplary measurements of the wedge plates and their position relative to one another and the material employed are compiled in the following Table T1.

TABLE T1

| Wedge No. | Material | Thickness [mm] | Wedge angle | Global tilting angle |
|---|---|---|---|---|
| K1 | N—PSK3 | d1: 30 | $\beta1$: 2.096° | $\alpha1$: −25.3° |
| K2 | fused quartz | d2: 17 | $\beta2$: 0.582° | $\alpha2$: 14.0° |
| K3 | N—BaF4 | d3: 15 | $\beta3$: −0.294° | $\alpha3$: 24.5° |
| K4 | S—NBH53 | d4: 15 | $\beta4$: −0.236° | $\alpha4$: 15.0° |
| K5 | N—BaF4 | d5: 15 | $\beta5$: 0.266° | $\alpha5$: −25.1° |

The subject matter of the invention is an arrangement of wedge plates such that three or more partial bundles which have a spectrally independent equidistant angle separation and intersect at the same point (objective pupil) preferably in a spectrally independent manner are formed at the output of this arrangement. In FIG. 1, the intersection point of the partial beams would lie, for example, on reflector R in front of the objective O and would fill the entrance pupil of the objective O centrically.

One compensation element per partial bundle is required in order to correct the above-mentioned effects:
 a) angles between partial bundles are not equidistant,
 b) more than two partial bundles do not intersect at the same point,
 c) the angles of the partial bundles are wavelength-dependent due to the dispersion of the glasses.

The degrees of freedom for an element of this type are thickness, wedge angle, tilt and material. Accordingly, it is possible to compensate for transverse chromatic aberrations through the wedge angle and for a color-dependent lateral offset of the bundles through the choice of wedge thickness and tilt. Further, through suitable choice of material, all of the bundles intersect spectrally independently at the same point (pupil).

For less strict requirements with respect to the equidistance of angles of the partial bundles and spectral independence of these angles, tiltable plane parallel plates could also be used instead of wedge plates K3, K4, K5 to compensate for the pupil position (unification in the pupil) through parallel offset and tilting of these plane parallel plates. K1 could then even be omitted.

Although the pupil position of the partial bundles should only play a subordinate part, even the plane parallel plates can be dispensed with so that only a splitter edge is required for angle separation.

FIGS. 2 to 4 show a construction for four partial bundles. Wedge K1 compensates for the chromatic aberrations of splitter wedge K2 for partial bundle ST2. The effects on partial bundles ST3 and ST4 are compensated through wedges K3 and K4. Wedge K3 acts on both bundles for reasons of space. Partial bundle ST1 is compensated through wedge K5. The advantage of the arrangement shown in FIGS. 2 to 4 consists in that the wedges can be large because they project into the construction from the outside. This allows the required wedge angles to be fabricated in a highly precise manner. Accordingly, the positional tolerances of the parts are relaxed, which automatically results in a very thermally stable construction because the angles of the partial bundles are not affected by the positional tolerances of the wedges. They are determined exclusively through the wedge angles and mainly through the wedge angle of splitter K2. This easily allows angular accuracies in the seconds range, which, of course, remain stable in the subsecond range. This is very advantageous for an application in the laser scanning microscope (LSM) with multi-spot excitation and detection.

K2 can also be tilted in a limited manner for adjusting the beam spacing provided the partial beams ST1-4 can still execute the subsequent passage as is shown.

Figure 5:
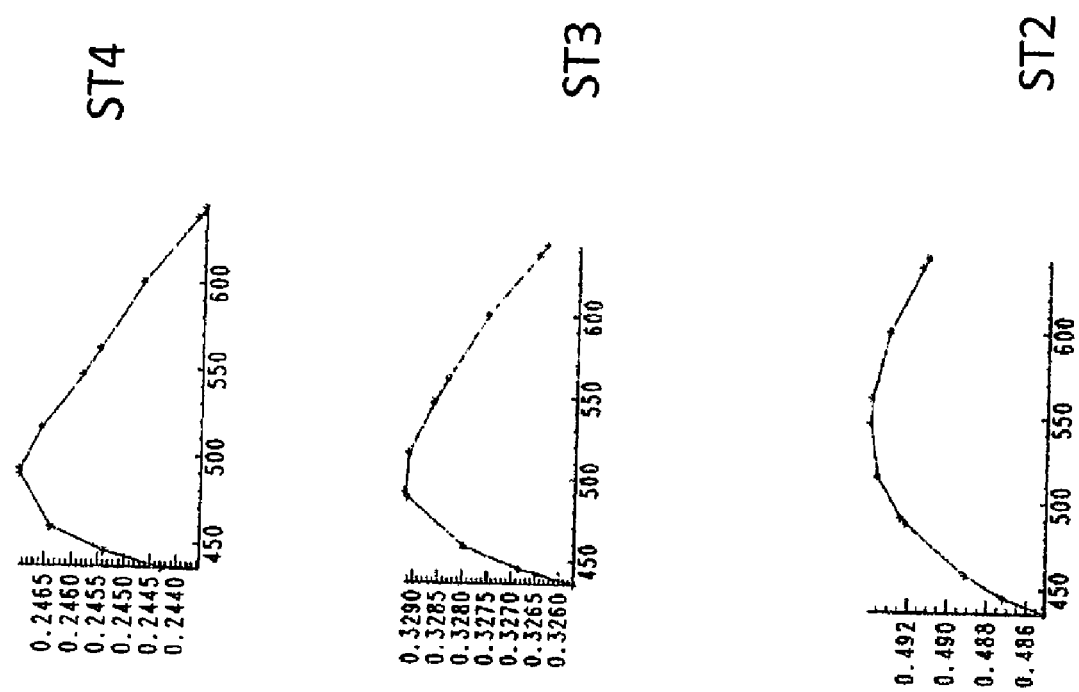
FIG. 5 shows spectral transmission of splitter layers at the output of K2 for partial bundles ST4, ST3, and ST2.

In order that all four of the partial bundles have the same intensity, a special coating of the four outlet regions of the splitter K2 is required. When the spectral transmissions of all of the rest of the compensation wedges and coatings are taken into account, spectral transmission curves can be set such that exactly the same transmission values per wavelength are achieved for the four partial bundles. FIG. 5 shows an example of an arrangement of this type.

The spectral transmission of the splitter layers at the output of K2 for partial bundles ST4, ST3 and ST2 is shown in FIG. 5.

The depicted splitter layers control the uniform intensity at all outputs of K2 through differing transmission/reflectivity, initially approximately 25% for ST4, then 33% for ST3 and then 50% for ST2, and a maximum transmission is coated for partial beam ST4. The attenuation of partial beams ST4, ST3 and ST1 through wedges 3, 4, 5 is negligible through low transmission losses.

The purpose of the relative angles is to allow the objective to focus these angles at different locations in contrast to parallel beams. The beams are preferably combined in the entrance pupil of the microscope objective and fill the latter centrically.

The spread of the partial beams (angles relative to one another) is determined through the wedge angle of K2 because the deflection at the output surface takes place at a different angle, while the tilting of K2 determines the mutual distance of the partial beams relative to one another. This refers to the lateral partial bundle spacing at the output of K2, i.e., at the side which is coated in a segmented manner by different partial mirrorings.

Element 2 is variably tiltable to a limited degree in the drawing provided the wedges 3, 4, 5 required for dispersion compensation are still impinged upon.

A wavelength-dependent (pre-)dispersion taking place through K1 is compensated in 2 or 3, 4 and 5, respectively.

Beam 3 passes through after 2 (WL compensated).

The position of the wedges is constructionally fixed such that they can project in from the outside.

3, 4, 5 can be configured as plane parallel plates, in which case 1 can be omitted (with relaxed requirements for dispersion compensation). Through their angle and parallel offset, they serve to ensure an intersection of all of the beams in the objective pupil.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A microscope for multi-beam scanning comprising:
an illumination beam path;
a detection beam path;
a microscope objective; and
a component, located in the illumination beam path, which is configured to generate a plurality of scanning beams from at least one illumination beam;
wherein the component comprises a wedge-shaped, light transmitting first component part, provided in the illumination beam path, which is configured to generate spatially offset partial beams, the scanning beams being generated at the first component part by multiple reflections at an at least partially partially-reflecting surface, and
wherein the component further includes a plurality of compensation elements for adjusting spread angles among the scanning beams generated by the first component part, the plurality of the compensation elements being arranged such that at least one scanning beam is adjusted independently from other scanning beams.

2. The microscope according to claim 1, further comprising:
an at least one-dimensional scanner configured to move the scanning beams over a sample in the illumination beam path.

3. The microscope according to claim 1;
wherein the scanning beams have at least partially relative to one another an angle other than zero degrees.

4. The microscope according to claim 1;
wherein the scanning beams intersect at least partially in an objective pupil of the microscope objective.

5. The microscope according to claim 1,
wherein the plurality of compensation elements include wedge-shaped light-transmitting component parts that are configured to compensate for a spectral dispersion and/or a beam direction.

6. The microscope according to claim 1;
wherein, for n scanning beams, n compensation elements are provided.

7. The microscope according to claim 1;
further comprising a compensation element that is arranged upstream of the first component part.

8. The microscope according to claim 1,
wherein the plurality of the compensation elements include adjustable plane plates configured to adjust an intersection point of the scanning beams or beam direction and/or beam offset thereof.

9. The microscope according to claim 1;
wherein at least some of the scanning beams have a common intersection point.

10. The microscope according to claim 1;
wherein the plurality of the compensation elements are arranged downstream of the first component part.

* * * * *